US010697401B2

(12) United States Patent
Hoffmann (10) Patent No.: US 10,697,401 B2
(45) Date of Patent: Jun. 30, 2020

(54) PROPULSION SYSTEM, AND METHOD FOR OPERATING A PROPULSION SYSTEM

(71) Applicant: Fuelsave GmbH, Walldorf (DE)

(72) Inventor: Dirk Hoffmann, Buchholz i.d.N. (DE)

(73) Assignee: FUELSAVE GMBH, Walldorf (DE)

( * ) Notice: Subject to any disclaimer, the term of this patent is extended or adjusted under 35 U.S.C. 154(b) by 0 days.

(21) Appl. No.: 16/681,106

(22) Filed: Nov. 12, 2019

(65) Prior Publication Data

US 2020/0080521 A1    Mar. 12, 2020

Related U.S. Application Data

(63) Continuation of application No. 15/747,995, filed as application No. PCT/EP2016/067388 on Jul. 21, 2016, now Pat. No. 10,495,032.

(51) Int. Cl.
*F02M 25/12* (2006.01)
*F02B 43/10* (2006.01)
(Continued)

(52) U.S. Cl.
CPC .............. *F02M 25/12* (2013.01); *B63H 21/14* (2013.01); *F02B 43/10* (2013.01); *F02B 61/00* (2013.01);
(Continued)

(58) Field of Classification Search
CPC ... F02M 25/12; F02B 43/10; F02B 2043/106; F02D 21/00; F02D 19/0644;
(Continued)

(56) References Cited

U.S. PATENT DOCUMENTS 6,326,703 B1* 12/2001 Clark ...................... F01D 15/10
290/1 R
10,495,032 B2* 12/2019 Hoffmann .............. F02M 25/12
(Continued)

FOREIGN PATENT DOCUMENTS

EP          2602358 A1    12/2013
KR      20110119055 A    11/2011
(Continued)

OTHER PUBLICATIONS

PCT/EP2016/067388, International Preliminary Report on Patentability, dated Jul. 4, 2017, 37 pages.

*Primary Examiner* — Jacob M Amick
(74) *Attorney, Agent, or Firm* — Hoffman Warnick LLC (57) ABSTRACT

Various implementations include propulsion systems and related methods of operation. In one implementation, a system includes: an internal combustion engine, wherein the internal combustion engine has a combustion chamber for burning a fossil fuel, an electrolysis chamber for producing hydrogen gas and oxygen gas, a turbocharger, a supply line connecting a compressor of the turbocharger to the combustion chamber, the supply line designed to convey a gas mixture including at least a part of the hydrogen gas and the oxygen gas to the combustion chamber, a gasification tank with volatile organic compounds received therein, and an air supply for supplying compressed air into the gasification tank, wherein the gas mixture, which is guided via the supply line to the combustion chamber, also includes gasified organic compounds from the gasification tank.

12 Claims, 2 Drawing Sheets

(51) Int. Cl.
  *F02D 19/06*   (2006.01)
  *F02D 19/08*   (2006.01)
  *B63H 21/14*   (2006.01)
  *F02B 61/00*   (2006.01)
  *F02D 21/00*   (2006.01)
  *F02B 37/00*   (2006.01)

(52) U.S. Cl.
  CPC ..... *F02D 19/0607* (2013.01); *F02D 19/0644* (2013.01); *F02D 19/0665* (2013.01); *F02D 19/0671* (2013.01); *F02D 19/081* (2013.01); *F02D 21/00* (2013.01); *F02B 37/00* (2013.01); *F02B 2043/106* (2013.01); *Y02T 10/121* (2013.01); *Y02T 10/32* (2013.01); *Y02T 10/36* (2013.01); *Y02T 70/5209* (2013.01); *Y02T 90/46* (2013.01)

(58) Field of Classification Search
  CPC ............. F02D 19/0671; F02D 19/0607; F02D 19/081; F02D 19/0665
  See application file for complete search history.

(56) References Cited

U.S. PATENT DOCUMENTS

| | | |
|---|---|---|
| 2006/0179819 A1 | 8/2006 | Sullivan |
| 2012/0067304 A1 | 3/2012 | Littmann |
| 2018/0216543 A1 | 8/2018 | Hoffmann |

FOREIGN PATENT DOCUMENTS

| | | |
|---|---|---|
| WO | 2007085094 A1 | 8/2007 |
| WO | 2008033107 A2 | 3/2008 |

\* cited by examiner

PROPULSION SYSTEM, AND METHOD FOR OPERATING A PROPULSION SYSTEM

PRIORITY CLAIM

This application is a continuation application of pending U.S. patent application Ser. No. 15/747,995 (Ship Propulsion System, and Method for Operating a Ship Propulsion System, filed on Jan. 26, 2018), which claims priority to PCT application number PCT/EP2016/067388 (filed on Jul. 21, 2016), and which further claims priority to EP application No. 15178884.1 (filed on Jul. 29, 2015).

TECHNICAL FIELD

The present invention relates to a ship propulsion system and a method for operating a propulsion system.

BACKGROUND

Propulsion systems which are subject-matter of this disclosure may drive a basically arbitrarily designed vessel (e.g., a ship) alone or in conjunction with another propulsion system. Such a ship system may be an auxiliary diesel engine, for example, which may be provided in addition to a propulsion system that burns crude oil for driving the vessel.

In one example, a generic ship propulsion system comprises at least an internal combustion engine for propelling a ship, wherein the internal combustion engine has a combustion chamber for burning a fossil fuel, in particular a diesel fuel.

In another example, a generic method for operating a ship propulsion system comprises the steps of propelling a ship with at least one internal combustion engine. For this, a fossil fuel, for example a diesel fuel, is introduced into a combustion chamber of the internal combustion engine.

Starting from known (e.g., ship) propulsion systems there is a need, in particular due to ever more stringent emission regulations, to design the combustion process of the internal combustion engine such that particularly low emission levels are reached. Simultaneously, the efficiency of the internal combustion engine should be particularly high.

KR 2011 0119055 A, US 2012/0067304 A1, EP 2 602 358 A1, US 2006/0179819 A1, and WO 2008/033107 A2 describe internal combustion engines with which hydrogen gas and oxygen gas are used for reducing pollutants in the exhaust. In US 2012/0067304 A1 and US 2006/0179819 A1, for example, the hydrogen gas and oxygen gas are produced in an electrolysis unit.

SUMMARY

All examples and features mentioned below can be combined in any technically possible way.

It may be regarded as an object of the invention to provide a propulsion system and a method for operating a propulsion system in which an internal combustion engine operates with a particularly high efficiency and has particularly low emissions. In some cases, the propulsion system is a ship propulsion system.

This object is solved with the ship propulsion system and with the method for operating a ship propulsion system as disclosed herein. Advantageous variants of the inventive propulsion system and the inventive method are also explained in the following description.

In some examples, the ship propulsion system of the above-referenced kind comprises, according to the invention, an electrolysis chamber for producing hydrogen gas and oxygen gas, and a vacuum pump for drawing off the hydrogen gas and the oxygen gas from the electrolysis chamber. Furthermore, a gasification tank is provided with volatile organic com-pounds, in particular methanol or ethanol, received and gasified therein, i.e., they are at least partially transferred into a gaseous state. Additionally a supply line for supplying a gas mixture to the combustion chamber is provided, the gas mixture including gasified organic compounds (that is a part of the volatile organic compounds that is transferred into the gaseous state) and at least a part of the hydrogen gas and the oxy-gen gas produced in the electrolysis chamber. The supply line and the gasification tank are hence arranged such that a gas mixture as defined above is supplied to the combustion chamber during operation of the ship propulsion system.

The method of the above-referenced kind comprises, according to the invention: producing hydrogen gas and oxygen gas in an electrolysis chamber, drawing off the hydrogen gas and the oxygen gas from the electrolysis chamber with a vacuum pump, gasifying volatile organic compounds, in particular methanol or ethanol, in a gasification tank, and supplying a gas mixture comprising gasified organic compounds and at least a part of the hydrogen gases and oxygen gases produced in the electrolysis chamber into the combustion chamber.

As an idea of the invention, hydrogen gas and oxygen gas produced by electrolysis are only supplied into the combustion chamber together with gaseous volatile organic compounds that means in particular together with gasified methanol and/or ethanol. Such a gas mixture can reduce production of NOX and may cause a particularly fast combustion of diesel in the combustion chamber. A fast combustion can pro-duce a higher pressure at a defined point in time, which eventually allows for a more efficient power transmission.

The gas mixture is always supplied in addition to a fossil fuel/fossil energy carrier into the combustion chamber and burnt there. The larger released energy fraction, for example at least 70% or at least 90%, comes from the fossil fuel, for example a diesel fuel. The supplemental gas mixture thus does not mainly serve as a replacement for an energy source but helps in causing a desired combustion process. In this way it is possible to produce fewer pollutants/emissions and furthermore the combustion process can take place faster which makes a more efficient force transmission possible.

The volatile organic compounds may in principle be a specific organic compound or a mixture of different organic compounds. The term "volatile" organic compounds may be understood as all organic compounds that are mainly gaseous at room temperature and/or have a boiling point below 100° C. or below 200° C. or 300° C. Organic compounds may in particular be hydrocarbons and/or all compounds that consist predominantly of hydrogen and carbon atoms. Examples of such organic compounds are alkanols (such as methanol and ethanol) or alkanes (such as methane or ethane).

The gasification tank may in principle be understood as any container in which volatile organic compounds are contained. There, at least part of the volatile organic compounds can be transferred from a liquid state into a gaseous state. The vacuum pump and the gasification tank may be preferably arranged such that the hydrogen gas and the oxygen gas are at least partially transported by the vacuum pump from the electrolysis chamber into the gasification tank. The gas mixture is thus produced in the gasification tank. The supply line may thus start at the gasification tank and may transport the gas mixture from there in the direction of the combustion chamber.

The gasification tank may thus comprise an inlet connected with the electrolysis chamber, and an outlet to output organic compounds that have been gasified (have been transferred into gaseous state) as well as hydrogen and oxygen gas that is being passed through. The gasification tank may further comprise a filling opening for refilling liquid organic compounds, for example ethanol.

It may be beneficial to supply hydrogen gas and oxygen gas into the gasification tank through several nozzles which are provided in a lower part/portion of the gasification tank. In particular, the lower half or the lower quarter of the gasification tank may be regarded as the lower part. This introduction in the lower part advantageously leads to a stronger gasification. By using several nozzles, the introduced gases may flow through the gasification tank more evenly distributed, which is again advantageous for a stronger gasification.

The supply line as such may extend to the combustion chamber. However, in principle it is sufficient if the supply line connects with a supply device/means that leads the gas mixture to the combustion chamber. It is preferred that the supply line connects with an air inlet manifold component/air drawing component of the internal combustion engine.

In aspects of the invention, a turbocharger is provided and the supply line is designed such that the gas mixture can be supplied to the combustion chamber via a compressor of the turbocharger. As a benefit, the combustion chamber and directly neighboring components of the inventive ship propulsion system may be built similarly as in conventional ship propulsion systems. Furthermore this embodiment of the invention al-lows for particularly efficient control of the amount of the gas mixture supplied into the combustion chamber. This is explained further below in greater detail.

The electrolysis chamber may generally be understood as any device that produces hydrogen gas and oxygen gas, in particular H2 and O2, by using electrical energy. A starting substance of the electrolysis may be water or a hydrous/aqueous mixture. It may be preferred if the electrolysis chamber and a supply system/line system from the electrolysis chamber to the gasification tank are designed such that the produced hydrogen gas and oxygen gas are jointly or unseparated transported as oxyhydrogen. With a comparably simple construction this allows an exact timing of ignition in the combustion engine by introducing the oxyhydrogen.

The vacuum pump may be a pump/compressor of a generally arbitrary kind. It creates a low pressure/reduced pressure which sucks hydrogen gas and oxygen gas out of the electrolysis chamber. The vacuum pump may also consist of several pump units. This may be particularly beneficial if the produced hydrogen gas and oxygen gas are separately sucked off, i.e., not as oxyhydrogen.

In addition to transporting hydrogen gas and oxygen gas from the electrolysis chamber, the vacuum pump may also enhance the efficiency of the electrolysis chamber. It is desirable for an electrolysis that electrodes of the electrolysis chamber are surrounded by liquid electrolyte. Cavitation or bubble production, i.e., gases such as produced hydrogen gas and oxygen gas, hamper the electrolysis and make higher temperatures necessary. This can be avoided in a variant of the invention in which the vacuum pump produces a reduced pressure in the electrolysis chamber, in particular a pressure below 1 bar, in particular between 200 mbar and 700 mbar, in particular between 300 mbar and 600 mbar or between 340 mbar and 580 mbar. Such a comparably low pressure allows operating the electrolysis chamber at a temperature below 40° C., in particular at 38 to 39° C. which increases efficiency of the electrolysis.

The vacuum pump can be operated to suck as much gas (in particular produced hydrogen and oxygen gas) out of the electrolysis chamber so that at most a quarter of the electrolysis chamber, preferably at most 10% of the electrolysis chamber, is filled with gas during operation of the electrolysis chamber.

The internal combustion engine of the ship propulsion system may be an engine de-signed in a principally known way which provides heat energy and thus motion energy for propulsion of the ship by combusting an (in particular fossil) energy carrier. An example of a fossil energy carrier is diesel, i.e., a diesel fuel, wherein the exact composition of the diesel fuel may be variable in substantially known ways.

The ship propulsion system may also comprise an exhaust filter for cleaning exhaust, for example a soot particle filter. Cleaning the exhaust gas filter is important for a preferably high life span of the exhaust filter. This can be achieved with oxygen gas. If oxygen is added to the exhaust upstream of the exhaust gas filter, it can act as a radical at the filter and can thus assist in cleansing the filter. This is accomplished in an embodiment of the invention. A separator, for example a diaphragm, may be pro-vided for separating the hydrogen gas and the oxygen gas which can be produced in the electrolysis chamber. Furthermore, a line/conduit is provided for supplying a part of the oxygen gas to the exhaust filter, wherein the gas mixture that is supplied through the supply line to the combustion chamber may comprise the remaining oxygen gas (i.e., the part of the oxygen gas that is not led to the exhaust filter) and the hydrogen gas as well as the gasified organic compounds.

Separating the produced oxygen gas and hydrogen gas may be carried out at in principle any location. It is also possible to supply oxygen gas and hydrogen gas from the electrolysis chamber unseparated to the combustion chamber, while a part of this oxyhydrogen mixture (i.e., the mixture of oxygen gas and hydrogen gas) is channeled off into a separate line and is only there separated with the separator into oxygen gas and—separated from the oxygen gas—hydrogen gas.

The electrolysis chamber is supplied with an electrical current with which the hydrogen gas and oxygen gas are produced in the electrolysis chamber. Furthermore, water is introduced from which the hydrogen gas and oxygen gas are produced. A controller can be provided and configured to control the electrical current and/or a water introduction into the electrolysis chamber and/or a pumping power of the vacuum pump in dependence from a momentary property of an operation of the internal combustion engine. The control may in particular be carried out such that the amount of introduced gas mixture is the larger, the larger the amount of fossil fuel is which is supplied to the combustion chamber. The produced gas mixture thus does not serve as a replacement for a fossil fuel/energy carrier. The gas mixture is rather used as an additive which influences the combustion process in a desired way. The controller may set the electrical current and the pumping power in particular such that a relation of injected diesel to introduced gas mixture is substantially constant, i.e., substantially independent from an injection rate and an injected amount of diesel. "Substantially constant" may be regarded as comprising variations of up to 10%, preferably not more than 5%, of the afore-mentioned relation.

In a variant, the controller is configured to use a boost pressure in an intake manifold of the internal combustion engine as the momentary property of the internal combustion engine operation, in dependence of which the electrical current and/or the pumping power are controlled. The boost pressure indicates a gas/air pressure in an intake path/intake manifold of the internal combustion engine. The controller may be configured to set the electrical current and the pumping power the larger, the higher the boost pressure. Instead of the boost pressure, it is possible to use another pressure dependent thereon for the control, for example an exhaust pressure, in particular upstream of the turbo charger. For obtaining the boost pressure and/or another pressure used for the control, appropriate pressure sensors may be provided. Instead of the pressure, another quantity associated with the engine power may be used for the control, for example a motor speed. However, it may be the case that using such electrical signals renders errors more likely compared to a control based on the (boost) pressure.

It may be preferred that additionally an air compressor for transporting air/gas into the gasification tank is provided. The air may be ambient air, in particular a mixture of any gases. The more air is pumped into the gasification tank, the larger is the amount of gasified organic compounds. This increases the amount of the produced gas mixture. This may be desirable when the internal combustion engine combusts fossil fuels with a particularly high rate and consequently a particularly large amount of produced gas mixture should be added.

For adding a larger amount of produced gas mixture in case of a larger amount of sup-plied fossil fuel, it may be preferable to operate the vacuum pump with increasing pumping power if the boost pressure raises. It may be provided that the vacuum pump is operated with maximal pumping power when the boost pressure reaches a pre-defined boost pressure threshold. If the boost pressure passes above that predefined boost pressure threshold, it may be desirable to add an even larger amount of gas mixture. The amount of oxygen gas and hydrogen gas is limited due to the vacuum pump and the electrolysis chamber, however, a larger amount of gasified organic com-pounds may be added by means of the air compressor. It may thus be provided that the air compressor is operated additionally when the boost pressure raises above the pre-defined boost pressure threshold. In particular, a power of the air compressor may be set the higher, the more the boost pressure raises above the predefined boost pressure threshold. In these cases, the vacuum pump is always operated with maximum pumping power. Due to the air compressor the composition of the gas mixture changes; however, this is still better than an insufficient amount of available gas mixture. In this control, instead of the boost pressure also another pressure may be used which de-pends on the boost pressure (for example an exhaust pressure). Furthermore, instead of the boost pressure another quantity/property may be used which increases with raising engine power, for example the engine speed.

It may be preferably that a storage tank is provided and connected with the gasification tank. The storage tank includes organic compounds and serves for filling the gasification tank. A gas mixture produced in the gasification tank should have a desired relation between oxyhydrogen and organic compounds, and to this end the gasification tank should not be excessively large. Nevertheless, a sufficiently large amount of organic compounds should be available/carried along, to which end a volume of the storage tank may be at least 3 times, preferably at least 5 times as large as a volume of the gasification tank.

Introducing the gas mixture may advantageously trigger ignition of a fossil fuel introduced into the combustion chamber. The combustion can take place faster due to the gas mixture which comprises oxyhydrogen. It may be preferred if an ignition timing is caused at a crankshaft angle of less than 20°, in particular between 17° and 19°, in particular between 17.5° and 18.5°, before the top dead center (of a piston of the internal combustion engine). This ignition timing can be defined and set by the timing of the introduction of the gas mixture into the combustion chamber. In this variant the ignition timing occurs tighter before the top dead center than usually. Such a late ignition timing can be chosen because the invention provides for a particularly fast combustion. At a desired point in time it is thus possible to create a larger pressure.

The invention also relates to a ship comprising a ship propulsion system as described herein.

In additional particular implementations, a system includes: an internal combustion engine, wherein the internal combustion engine has a combustion chamber for burning a fossil fuel, an electrolysis chamber for producing hydrogen gas and oxygen gas, a turbocharger, a supply line connecting a compressor of the turbocharger to the combustion chamber, the supply line designed to convey a gas mixture including at least a part of the hydrogen gas and the oxygen gas to the combustion chamber, a gasification tank with volatile organic compounds received therein, and an air supply for supplying compressed air into the gasification tank, wherein the gas mixture, which is guided via the supply line to the combustion chamber, also includes gasified organic compounds from the gasification tank.

In certain cases, the system further includes: a vacuum pump for drawing off the hydrogen gas and the oxygen gas from the electrolysis chamber, wherein the vacuum pump and the gasification tank are arranged so that the hydrogen gas and the oxygen gas can be conveyed at least partially through the vacuum pump from the electrolysis chamber into the gasification tank to produce the gas mixture.

In particular aspects, the electrolysis chamber and a pipeline system are formed from the electrolysis chamber to the gasification tank so that hydrogen gas and oxygen gas can be conveyed, unseparated, as oxyhydrogen.

In some implementations, the hydrogen gas and oxygen gas conveyed into the gasification tank are introduced via a plurality of nozzles in a lower part of the gasification tank.

In certain cases, a storage tank is provided and connected to the gasification tank for filling the gasification tank with organic compounds.

In particular aspects, the electrolysis chamber is supplied with an electric current, through which the hydrogen gas and the oxygen gas are obtained in the electrolysis chamber, and the system further includes a controller configured to control at least one of: the electric current, an introduction of water into the electrolysis chamber, or a pumping capacity of the vacuum pump, in dependence on a momentary property of an internal combustion engine operation.

In some cases, the controller is configured to: use a boost pressure of the internal combustion engine as a momentary property of the internal combustion engine operation in dependence on which the at least one of: the electric current, the water introduction or the pumping capacity of the vacuum pump is controlled, a boost pressure of the internal combustion engine, and set the electric current and the pumping capacity to be higher, the higher the boost pressure is.

In certain implementations, a ship includes the system according to various aspects.

In particular cases, a method for operating a ship propulsion system includes: propelling a ship with an internal combustion engine by introducing a fossil fuel into a combustion chamber of the internal combustion engine, wherein, in an electrolysis chamber, hydrogen gas and oxygen gas are produced, wherein a supply line connects a compressor of a turbocharger with the combustion chamber, and wherein a gas mixture is conveyed through the supply line to the combustion chamber, the gas mixture including at least a part of the hydrogen gas and the oxygen gas, wherein: the hydrogen gas and the oxygen gas are drawn off from the electrolysis chamber, in a gasification tank, volatile organic compounds are gasified, an air supply for supplying compressed air into the gasification tank is provided, and the gas mixture, which is guided to the combustion chamber, also includes gasified organic compounds from the gasification tank.

In some aspects, in the electrolysis chamber, a reduced pressure is generated by the vacuum pump, the reduced pressure being between 200 mbar and 700 mbar.

In certain cases, a vacuum pump draws off so much gas from the electrolysis chamber that, during operation of the electrolysis chamber, at most a quarter of the electrolysis chamber is filled with gas.

In some aspects, an ignition timing is effected at a crankshaft angle of less than 20 before top dead center.

Variants of the method of the invention result from the intended use of the described embodiments of the propulsion system. Furthermore, preferred embodiments of the propulsion system of the invention, in particular its controller, may be configured to carry out the described variants of the method of the invention.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

Further benefits and features of the invention will be described herein with reference to the attached schematic figure, wherein.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Commonly labeled components in the FIGURES are considered to be substantially equivalent components for the purposes of illustration, and redundant discussion of those components is omitted for clarity.

Figure 1:
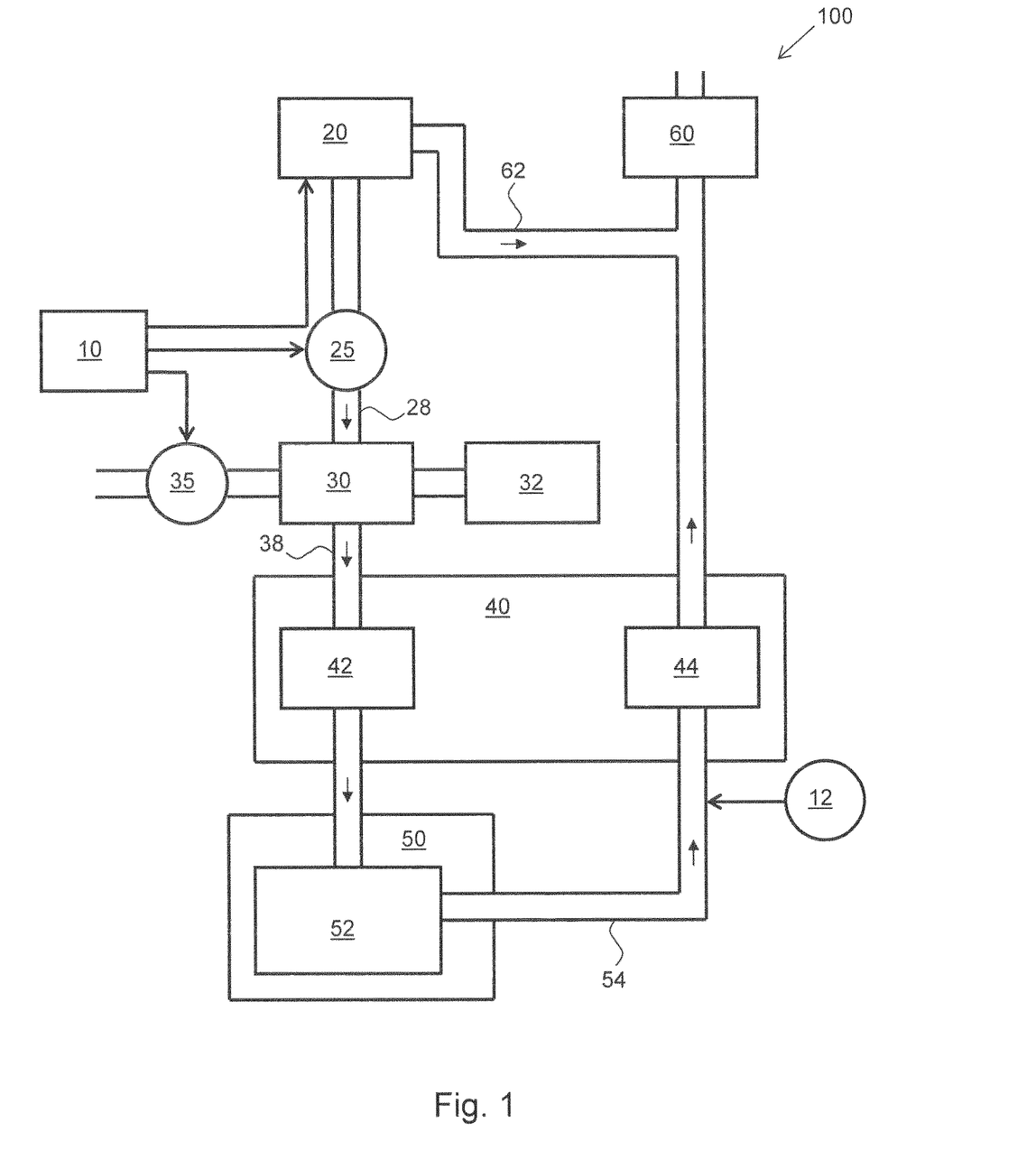
FIG. 1 is a schematic representation of an embodiment of a ship propulsion system according to aspects of the invention.

FIG. 1 shows schematically an embodiment of a system 100 according to the invention. It may be part of a ship according to the invention (not depicted). In addition to the system 100, a ship may comprise another propulsion system, for example a combustion engine for crude oil. Furthermore, a ship may comprise several systems 100 which may be each formed as described below.

As featured components, the system (e.g., propulsion system such as a ship propulsion system) 100 comprises an electrolysis chamber 20 for producing hydrogen gas and oxygen gas, a gasification tank 30 for gasifying volatile organic compounds, and an internal combustion engine 50, which is supplied with fossil fuel as well as the produced hydrogen gas, the oxygen gas and the gaseous organic compounds.

By adding this gas mixture, the combustion of diesel or another fossil fuel may take place faster and the amount of pollutants or emissions output in the exhaust gas is reduced.

As a first step, water or another starting material is converted in the electrolysis chamber 20 with the help of electrical energy into hydrogen gas, oxygen gas and possibly further components. The produced hydrogen gas and the produced oxygen gas are transported via a supply system or line system 28. These two gases may in particular be provided as a mixture, e.g., oxyhydrogen. For transportation a vacuum pump 25 is provided in the supply system 28. The vacuum pump 25 produces a reduced pressure in the electrolysis chamber 20, thus sucking off the oxygen gas and the hydrogen gas. Furthermore, the reduced pressure in the electrolysis chamber 20 reduces the amount of electrolyte (which is present in the electrolysis chamber 20) that transfers from the liquid state into a gaseous state. In this way, the efficiency of the electrolysis chamber 20 can be increased.

The supply system 28 supplies the oxygen gas and the hydrogen gas to the gasification tank 30. Organic compounds such as methanol and/or ethanol are provided in the gasification tank 30 and experience a surface gasification due to introduction of the hydrogen gas and the oxygen gas. To this end the hydrogen gas and the oxygen gas are introduced into the gasification tank 30 in a lower part thereof, in particular at its bottom. A gas mixture is thus formed within the gasification tank 30, comprising at least hydrogen gas, oxygen gas and gasified organic compounds, in particular methanol and/or ethanol. This gas mixture is then forwarded via a supply line 38. Instead of forwarding the oxyhydrogen through the gasification tank 30, it is alternatively also possible to direct gaseous organic compounds out of the gasification tank and only then bring it together with the oxyhydrogen.

The size of the gasification tank 30 may be chosen such that a desired amount of organic compounds in transferred into the gaseous state and forms a mixture with hydrogen gas and oxygen gas, when the hydrogen gas and oxygen gas is passed through the gasification tank 30. A ship comprising the (e.g., ship propulsion) system of the invention shall carry larger amounts than possible with the gasification tank, and to this end a storage tank 32 may be provided. The storage tank 32 supplies organic compounds to the gasification tank 30 and is not itself supplied with produced hydrogen gas or oxygen gas. A level sensor may be provided at the gasification tank 30 with which introduction of organic compounds from the storage tank 32 into the gasification tank 30 may be controlled.

The supply line 38 leads the produced gas mixture from the gasification tank 30 to a compressor 42 of a turbocharger 40. The gas mixture may be transported to the com-pressor 42 together with ambient air. For this merging, a corresponding line may be provided (not depicted). The gas mixture is led from the turbocharger 40 into a combustion chamber 52 of the internal combustion engine 50. In the combustion chamber 52 the gas mixture ignites and causes combustion of injected fossil fuel, for example injected diesel fuel.

Exhaust gases are guided from the combustion chamber 52 via an exhaust line 54 to an exhaust turbine 44 of the turbocharger 40. A pressure of the exhaust gas is thus used by the exhaust turbine 44 to transport the gas mixture with the compressor 42 in the direction of the internal combustion engine 50. Downstream of the exhaust turbine 44, the exhaust gas reaches an optional exhaust filter 60.

A supply of the gas mixture into the combustion chamber 52 shall be increased if the amount of injected/introduced fossil fuel increases. For this purpose, inter alia, the turbocharger 40 is used. The compressor 42 of the turbocharger 40 is driven by the exhaust turbine 44. The exhaust turbine 44 drives the compressor 42 with more power if an exhaust pressure at the exhaust turbine 44 increases. If only small amounts of fuel are combusted in the combustion chamber 52, it follows that the pressure at the exhaust turbine 44 is small and the compressor 42 only produces a small suction in the supply line 38. If, on the other hand, larger amounts of diesel are combusted in the combustion chamber 52, then the compressor 42 will cause a stronger suction of gas mixture from the supply line 38.

Furthermore, the amount of the produced gas mixture may be controlled according to demand. To this end, controller 10 may be provided which may in particular be configured to adjust an electrical current through the electrolysis chamber 20 and may thus set the amount of hydrogen gas and oxygen gas to be produced. Furthermore, the controller 10 may control the vacuum pump 25 and may thus set the amount of hydrogen gas and oxygen gas that is transported from the electrolysis chamber 20 into the gasification tank 30. For increasing the amount of produced gas mixture, a larger electrical current and a higher pumping power of the vacuum pump 25 may be set. The amount of produced gas mixture may be set the larger, the higher the rate or amount of injected diesel into the combustion chamber 52. The boost pressure of the internal combustion engine 50 may be used as a measure for this. The controller 10 may thus be configured to increase the pumping power of the vacuum pump 25 and the electrical current in the electrolysis chamber 20 with increasing boost pressure. Pressure measuring means for this purpose may be provided. In the depicted example, pressure measuring means 12 are provided which measure an exhaust pressure upstream of the turbo-charger 40. Also this exhaust pressure may be used for controlling the produced amount of gas mixture.

It may be desired to supply even larger amounts of gas mixture to the turbocharger 40 or the internal combustion engine 50 as can be achieved with a maximum current through the electrolysis chamber 20 and a maximum pumping power of the vacuum pump 25. In particular for such a case, an additional air compressor 35 may be provided. The air compressor 35 pumps air, in particular ambient air, into the gasification tank 30 and thus causes an increased gasification of the organic compounds. It may be desired if a line of the air compressor 35 and the line system 28 end at the vacuum pump 25 into a common line so that air from the air compressor 35 and hydrogen gas and oxygen gas produced by the electrolysis are let via the same nozzles into the gasification tank 30. In other variants, however, it may be preferred that the air from the air compressor 35 and the produced hydrogen gas and oxygen gas reach the gasification tank 30 through separate lines.

The controller 10 also set a pumping power of the air compressor 35. It may be provided that the air compressor 35 is only operated when the electrolysis chamber 20 is supplied with a maximum current and the vacuum pump 25 operates with maximum pumping power.

It may also be beneficial if gas can only be introduced into the gasification tank 30 through the air compressor 35 and not through the vacuum pump 25. In this way the amount of organic compounds introduced into the internal combustion engine 50 is adjustable independent from the amount of oxyhydrogen supplied to the internal combustion engine.

For cleaning exhaust filter 60 particularly efficiently, it may be supplied with oxygen gas from the electrolysis chamber 20. In the depicted embodiment, a line 62 is provided for this purpose which leads from electrolysis chamber 20 to exhaust filter 60. Depending on the embodiment, a design of electrolysis chamber 20 may be preferred in which either oxygen gas is guided through line 62 separated from and without the hydrogen gas, or oxygen gas and hydrogen gas are together transported through line 62.

By supplying the produced gas mixture to the fossil energy carrier in the combustion chamber 52, a particularly fast combustion is made possible. This allows ignition to take place very shortly before a top dead center of the piston of the internal combustion engine 50 which makes a higher efficiency possible. Furthermore, the amount of produced pollutants in the exhaust is reduced.

Figure 2:
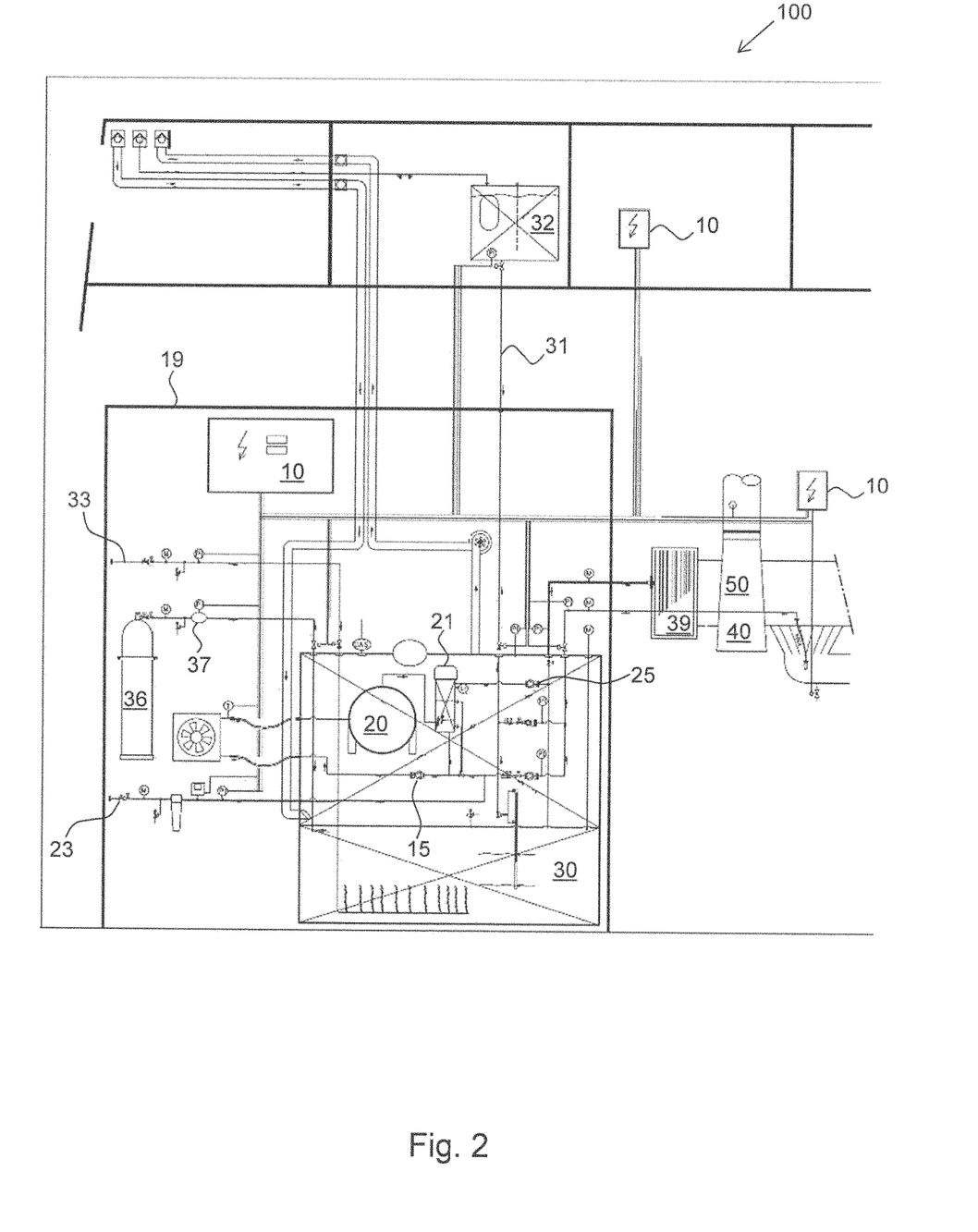
FIG. 2 is a schematic representation of a further embodiment of a ship propulsion system according to aspects of the invention.

A further embodiment of a system (e.g., ship propulsion system) 100 according to the invention is shown schematically in FIG. 2. Components with the same reference numerals as in FIG. 1 may be built similarly and have the same effect as described with respect to FIG. 1, or vice versa. As featured components, the system 100 comprises again an electrolysis chamber 20, a gasification tank 30 and a turbo charger 40 as well as an internal combustion engine 50.

As described with respect to FIG. 1, the electrolysis chamber 20 produces hydrogen gas and oxygen gas. Together with gaseous volatile hydrocarbons from the gasification tank 30, the hydrogen gas and oxygen gas are supplied via the turbo charger 40 to the internal combustion engine 50. A storage tank 32 is furthermore depicted which includes a supply of volatile hydrocarbons, in particular a supply of ethanol or in general other volatile organic compounds. These can be adjustably introduced into the gasification tank 30 via a line 31.

Furthermore, an air supply 33 for supplying compressed air into the gasification tank 30 is shown. This air supply 33 can be beneficial for producing larger amounts of gaseous volatile hydrocarbons in the gasification tank 30, in order to supply larger amounts of gaseous volatile hydrocarbons to the turbo charger 40 and the internal combustion engine 50. The compression of air may be achieved with the air compressor which is not shown here. Whereas compressed ambient air, i.e., a mixture of mostly nitrogen and oxygen, may be introduced into the gasification tank 30 with the air supply 33, it is also possible to provide a $CO_2$ tank 36 from which CO2 can be supplied into the gasification tank 30, con-trolled with a valve 37.

The electrolysis chamber 20 may connect to a condensate trap 21 or condensate accumulator 21 in which electrolyte and the produced mixture of hydrogen and oxygen may be separated. The electrolyte condensates in the condensate trap 21 and can then be pumped back into the electrolysis chamber 20 with an electrolyte circulation pump 15. The condensate trap 21 thus may advantageously protect the internal combustion engine 50 against entry of liquids. Gaseous hydrogen and oxygen gases are, in contrast, drawn out of the condensate trap 21 with the vacuum pump 25.

The oxyhydrogen (that is the produced hydrogen and oxygen gases) transported with the vacuum pump 25 are transported together with hydrocarbons or other organic com-pounds out of the gasification tank 30 and via a line 28 to a diaphragm 39 of the turbo charger 40. Water can be directed through a water inlet 23 into the electrolysis chamber 20 where it is converted into hydrogen gas and oxygen gas. The electrolyte circulation pump 15 can also be used for transporting water from the water inlet 23 to the electrolysis chamber 20, which allows an easier and cost-efficient setup. As shown, a water line from the water inlet 23 and an electrolyte line from the condensate trap 21 may lead to a com-mon line which in turn leads to the electrolyte circulation pump 15.

The electrolysis chamber 20, which produces the easily ignitable oxyhydrogen, may be arranged in an explosion-proof area 19. This explosion-proof area 19 may in particular be formed by an air-tight casing and/or may comprise galvanically separated transmitters for electrical signals. Besides the electrolysis chamber 20, also the gasification tank 30, the condensate trap 21 and the vacuum pump 25 may be arranged in this explosion-proof area 19. To avoid an undue large size of the explosion-proof area 19, the storage tank 32, in contrast, may be beneficially arranged outside the explosion-proof area 19. The turbo charger 40 and its diaphragm 39 are also arranged outside the explosion-proof area 19.

The system (e.g., propulsion system such as a ship propulsion system) of the invention allows to operate an internal combustion engine particularly efficiently by adding oxyhydrogen and additional volatile organic compounds. Furthermore, production of pollutants/emissions is thus reduced.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

I claim:

1. A system, comprising
an internal combustion engine,
wherein the internal combustion engine has a combustion chamber for burning a fossil fuel,
an electrolysis chamber for producing hydrogen gas and oxygen gas,
a turbocharger,
a supply line connecting a compressor of the turbocharger to the combustion chamber, the supply line designed to convey a gas mixture including at least a part of the hydrogen gas and the oxygen gas to the combustion chamber,
a gasification tank with volatile organic compounds received therein, and
an air supply for supplying compressed air into the gasification tank,
wherein the gas mixture, which is guided via the supply line to the combustion chamber, also includes gasified organic compounds from the gasification tank.

2. The system as defined in claim 1, further comprising:
a vacuum pump for drawing off the hydrogen gas and the oxygen gas from the electrolysis chamber,
wherein the vacuum pump and the gasification tank are arranged so that the hydrogen gas and the oxygen gas can be conveyed at least partially through the vacuum pump from the electrolysis chamber into the gasification tank to produce the gas mixture.

3. The system as defined in claim 1, wherein:
the electrolysis chamber and a pipeline system are formed from the electrolysis chamber to the gasification tank so that hydrogen gas and oxygen gas can be conveyed, unseparated, as oxyhydrogen.

4. The system as defined in claim 2, wherein:
the hydrogen gas and oxygen gas conveyed into the gasification tank are introduced via a plurality of nozzles in a lower part of the gasification tank.

5. The system as defined in claim 1, wherein:
a storage tank is provided and connected to the gasification tank for filling the gasification tank with organic compounds.

6. The system as defined in claim 1 wherein:
the electrolysis chamber is supplied with an electric current, through which the hydrogen gas and the oxygen gas are obtained in the electrolysis chamber, and
further comprising a controller configured to control at least one of: the electric current, an introduction of water into the electrolysis chamber, or a pumping capacity of the vacuum pump, in dependence on a momentary property of an internal combustion engine operation.

7. The system as defined in claim 6, wherein:
the controller is configured to:
use a boost pressure of the internal combustion engine as a momentary property of the internal combustion engine operation in dependence on which the at least one of: the electric current, the water introduction or the pumping capacity of the vacuum pump is controlled, a boost pressure of the internal combustion engine, and
set the electric current and the pumping capacity to be higher, the higher the boost pressure is.

8. A ship comprising:
a system as defined in claim 1.

9. A method for operating a ship propulsion system, the method comprising:
propelling a ship with an internal combustion engine by introducing a fossil fuel into a combustion chamber of the internal combustion engine,
wherein, in an electrolysis chamber, hydrogen gas and oxygen gas are produced, wherein a supply line connects a compressor of a turbocharger with the combustion chamber, and wherein a gas mixture is conveyed through the supply line to the combustion chamber, the gas mixture including at least a part of the hydrogen gas and the oxygen gas, wherein:

the hydrogen gas and the oxygen gas are drawn off from the electrolysis chamber, in a gasification tank, volatile organic compounds are gasified, an air supply for supplying compressed air into the gasification tank is provided, and the gas mixture, which is guided to the combustion chamber, also includes gasified organic compounds from the gasification tank.

10. The method as defined in claim 9, wherein:
in the electrolysis chamber, a reduced pressure is generated by the vacuum pump, the reduced pressure being between 200 mbar and 700 mbar.

11. The method as defined in claim 9, wherein:
a vacuum pump draws off so much gas from the electrolysis chamber that, during operation of the electrolysis chamber, at most a quarter of the electrolysis chamber is filled with gas.

12. The method as defined in claim 9, wherein:
an ignition timing is effected at a crankshaft angle of less than 20 before top dead center.

* * * * *